Aug. 19, 1947.                C. M. JOHNSON                2,425,809
                               UNIVERSAL JOINT
                            Filed Oct. 23, 1944
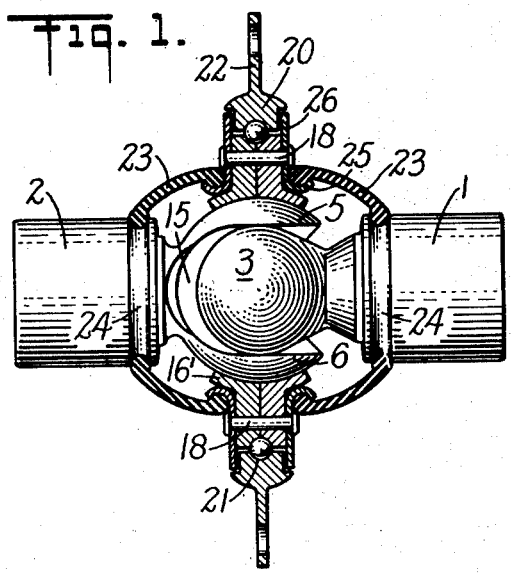
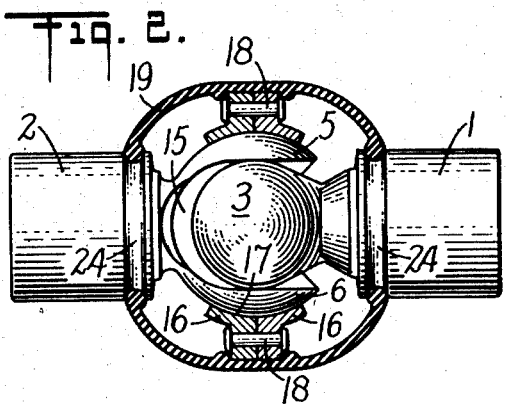
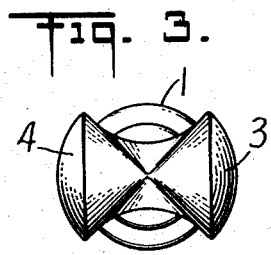
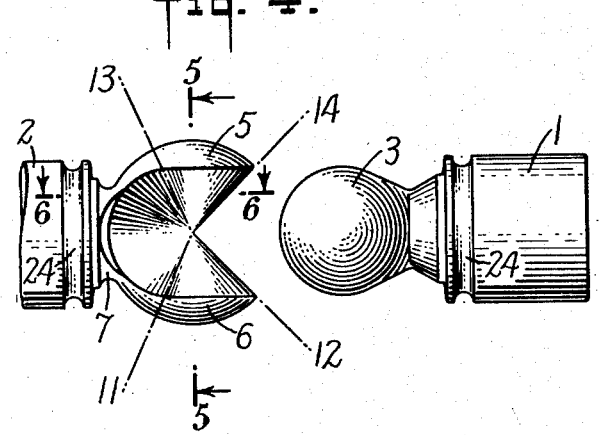
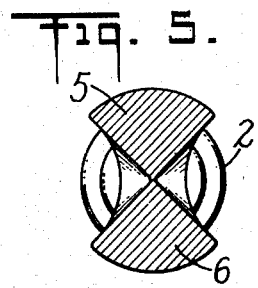
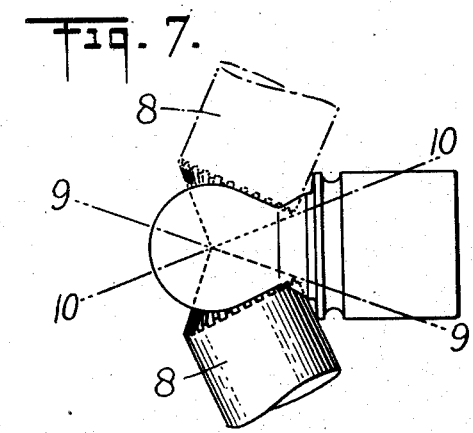
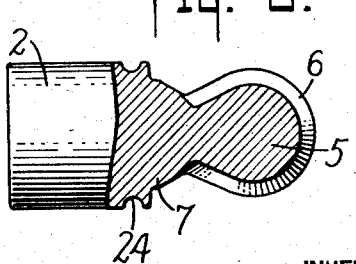
INVENTOR
*Corydon M. Johnson*
BY
*Blair, Curtis & Hayward*
ATTORNEYS Patented Aug. 19, 1947

2,425,809

UNITED STATES PATENT OFFICE 2,425,809

UNIVERSAL JOINT

Corydon M. Johnson, Freeport, N. Y.

Application October 23, 1944, Serial No. 559,893

5 Claims. (Cl. 64—9)

This invention relates to a universal joint for transmitting motion from one shaft to another, particularly when the longitudinal axes of the shafts are arranged in angular relationship.

An object of the invention resides in the provision of such a joint, which is so constructed that the greatest amount of material is located at the points of greatest strain with line contacts between the interengaging elements of the joint, which line contacts shift through a considerable area as the joint rotates.

A further object of the invention resides in providing a joint which consists entirely of two parts which may be integral with, or fixedly attached to, the driving shaft and the driven shaft.

A further object of the invention resides in the provision of a joint of the character described, which may be produced by either a simple milling or casting operation.

It is still a further object of the invention to so construct the joint that the two parts thereof are identical in construction, thus simplifying the production and assembly operations.

A further object of the invention is to provide the combination of the universal joint with a combined bearing member and support, which is of such character that both the bearing member and support will be at the center of articulation of the two shafts, thus facilitating the installation of the assembly, as for instance, in aeroplane constructions where the controls are operated by articulated shafts and where it is desirable and convenient to mount the universal joint with its combined bearing member and support on such structural elements as bulkheads, brackets, ribs, etc.

Other objects of the invention will appear as the description progresses, and it is thought unnecessary to here point them out in detail.

In the drawings:

Figure 1 is an elevation of the universal joint showing the bearing members, supporting flange and oil seal in section;

Figure 2 illustrates another form of the invention wherein the universal joint is shown in elevation and the associated parts in section;

Figure 3 is an end elevation of one of the universal joint elements;

Figure 4 is a side elevation of the universal joint showing the two elements thereof separated;

Figure 5 is a sectional view on line 5—5 of Figure 4;

Figure 6 is a sectional view on line 6—6 of Figure 4; and

Figure 7 is a view illustrating the manner in which each universal joint element is produced by means of a milling cutter.

The form of the invention illustrated in the drawings includes articular shaft sections 1 and 2, with which the universal joint elements are integrally formed.

Each of these elements includes a pair of diametrically arranged lobes which are indicated respectively by the reference numerals 3, 4, 5 and 6, which are mated to form the complete universal joint.

To aid in the understanding of the particular form of each of these lobes, it will perhaps be better to first describe one method of producing them. On the end of each shaft section a substantially spherical member is formed, which is attached to the shaft section by a neck portion 7. This spherical portion may be formed by turning or casting. A milling cutter, which is indicated at 8, in Figure 7, is used to mill out a portion of the sphere to form the two lobes. This may be done by directing the longitudinal center line of the milling cutter to the center of the sphere, and causing the milling cutter to cut away the material when located in the position shown in full lines in Figure 7, for instance, until the apex of the milling cutter reaches the center of the sphere.

The milling cutter and the spherical member are then relatively rotated about the center of the sphere as an axis until the parts reach the relationship that exists when the milling cutter reaches the relative position with the shaft section shown in dotted lines in Figure 7. When a milling cutter having a cutting face that is 45° from the vetrical axial line of the cutter is used, it is preferable to so position the shaft section and the milling cutter on the initial cut that the line of cut indicated by the construction line 9—9 in Figure 7 is subsantially 20° from the axial line of the shaft section and it is desirable to move the shaft section and the milling cutter about the center of the sphere as the axis until they have reached such relative positions that the cut on the opposite side, as indicated by the construction line 10—10, is substantially 20° from the axial line of the shaft.

The second universal element is formed in the same manner as that which is above described for the formation of the first element.

The result of these operations is, of course, that the two universal elements will intermesh, as shown in Figures 1 and 2 of the drawings, forming, in effect, a sphere.

The portion of each face of each of the lobes of the universal joint between the lines 11 and 12 is substantially conical, while the portion of each face of each of the lobes between the lines 11 and 13 is likewise substantially conical but in the reverse direction to the face between 11 and 12. Thus the three surfaces between 12 and 11, 11 and 13, and 13 and 14, form what might be termed a compound conical-convexo-concavo-convexo surface. However, it is to be understood that the surface between 11 and 13 need not be of the form described beyond the line of contact between it and the complemental lobe of the other universal element, it being sufficient that enough space at 15 be left to permit the articulation of the joint.

The important consideration is that the lobes of the two universal elements have conical surfaces throughout the area of their contact during the rotation of the shaft and the articulation of the joint, regardless of the angularity of the shaft sections.

I have described one manner of forming the universal joint as, for instance, by the use of a milling cutter, but it is of course to be understood that it may be formed by forging or casting. When the shaft sections are arranged in angular relationship, and are set into rotative movement, the line contact between the lobes of the joint shift about the center of the sphere as a pivot from one side to the other of a plane perpendicular to the axis of one of the shafts. Thus the plane of the contact areas between two of the adjacent faces of the lobes is, in effect, triangular.

In Figure 2 of the drawings I have illustrated a retainer bearing which is made up of two like annular members 16, which have an inner spherical bearing surface 17 which is complemental to the spherical action surfaces of the lobes of the universal joint, and are secured together by suitable means such as rivets 18. Thus this retainer bearing not only acts as a bearing for the universal joint but also retains the two elements of the universal in interengaged relationship.

If desired, an oil seal 19 may house the entire assembly. Of course it is to be understood that the use of this retainer bearing is not essential to the operation of the universal joint as the shaft sections may be supported and prevented from having longitudinal movement by any other means.

In Figure 1 of the drawings I have illustrated the two annular members 16' as extending some distance beyond the rivets 18 and cooperating with a ball race 20, between which annular members and the ball race ball bearings or other suitable form of bearings 21 are located. In this form the race 20 may be provided with an extending flange 22 for securement to a stationary part so that the universal joint will find a bearing and a support as well as a retainer for the two elements thereof in one assembly.

In this form of the invention an oil seal 23 may be provided which is interlocked with a groove 24 in each of the shaft sections, as it is also in Figure 2, and with a flange 25 on a plate 26, which is secured to the adjacent annular member 16' by the rivets 18 and extends to a point 26' to seal the grease within the ball or other bearing brace.

What I claim is:

1. An articulated joint consisting of two interengaged parts each constructed and arranged to have relative pivotal movement about a common center and having a conical shaped bearing surface movable relative to the like bearing surface of the other and said interengaged parts being arranged with, the apices of said conical shaped bearing surfaces interengaging substantially at the center of pivotal movement.

2. A two part articulated joint, each part including two lobes, each lobe being substantially conical and means for supporting said parts in position with the apical ends of the lobes of one part bearing upon and directly transmitting thrust through the apical ends of the lobes of the other part substantially at the center of articulation.

3. An articulated joint comprising two interengaged parts, each constructed and arranged to have relative pivotal movement about a common center and having a conical shaped bearing surface movable relative to the like bearing surface of the other, and said interengaged parts being arranged with the apices of the said conical shaped bearing surfaces interengaging substantially at the center of pivotal movement, and each of said interengaged parts having a spherical outer bearing surface, and means engaging said spherical outer bearing surface and positioned to support and maintain said interengaged parts in thrust transmitting relation through portions thereof at said center of pivotal movement.

4. A universal joint including two interengaged shaft end portions only, a point bearing between said shaft end portions at their axial centers, and at least two coacting sliding bearings between the shaft end portions, each defined by a line extending radially from the point bearing.

5. A universal joint including two interengaged shaft end portions only, a point bearing between said shaft end portions at their axial centers, at least two coacting sliding bearings between the shaft end portions, each defined by a line extending radially from the point bearing, the shaft end portions together defining a spherical outer face, and a bearing member surrounding said shaft end portions and having a complemental face coacting with said spherical face to maintain the point bearing in constant operative condition.

CORYDON M. JOHNSON.

REFERENCES CITED

The following references are of record in the file of this patent:

UNITED STATES PATENTS

| Number | Name | Date |
|---|---|---|
| 763,127 | Tilden | June 21, 1904 |
| 1,397,951 | Fischer | Nov. 22, 1921 |
| 2,331,982 | Johnson | Oct. 19, 1943 |
| 1,557,569 | Eames et al. | Oct. 20, 1925 |
| 802,299 | Lorenc et al. | Oct. 17, 1905 |
| 1,241,118 | Hoskins | Sept. 25, 1917 |
| 1,639,703 | Potter | Aug. 23, 1927 |